US012023694B2

(12) United States Patent
Lin

(10) Patent No.: US 12,023,694 B2
(45) Date of Patent: Jul. 2, 2024

(54) MULTIFUNCTIONAL CLEANING MACHINE

(71) Applicant: PANIOR INC, Denver, CO (US)

(72) Inventor: Ligen Lin, Shenzhen (CN)

(73) Assignee: PANIOR INC, Denver, CO (US)

( * ) Notice: Subject to any disclaimer, the term of this patent is extended or adjusted under 35 U.S.C. 154(b) by 0 days.

(21) Appl. No.: 18/336,049

(22) Filed: Jun. 16, 2023

(65) Prior Publication Data

US 2024/0033754 A1 Feb. 1, 2024

(30) Foreign Application Priority Data

May 24, 2023 (CN) ......................... 202321272812.2

(51) Int. Cl.
*B05B 1/28* (2006.01)
*B08B 3/02* (2006.01)

(52) U.S. Cl.
CPC ................ *B05B 1/28* (2013.01); *B08B 3/024* (2013.01); *B08B 2203/0264* (2013.01)

(58) Field of Classification Search
CPC .... B05B 1/28; B08B 3/024; B08B 2203/0264
See application file for complete search history.

(56) References Cited

U.S. PATENT DOCUMENTS 2,224,202 A * 12/1940 Smellie ..................... A47L 5/34 55/400
2,971,210 A * 2/1961 Thompson ................ A47L 9/08 15/346
3,004,279 A * 10/1961 Ringer .................. E01H 1/0872 451/92
3,432,969 A * 3/1969 Byttebier .................. E01H 1/08 451/92
3,748,050 A * 7/1973 Poppitz ................... A47L 11/38 401/289
3,832,069 A * 8/1974 Petsch ................. A47L 11/4075 401/289
3,869,749 A * 3/1975 London ................. B66B 31/003 15/88.4
3,916,568 A * 11/1975 Rose ....................... B24C 3/065 451/92
3,959,846 A * 6/1976 Yasuda ................. E01H 1/0836 15/354
4,037,290 A * 7/1977 Rose ....................... B24C 3/065 15/345

(Continued)

FOREIGN PATENT DOCUMENTS

EP 2743173 A1 * 6/2014 ............. B63B 59/08

*Primary Examiner* — Benjamin L Osterhout
(74) *Attorney, Agent, or Firm* — Zhigang Ma

(57) ABSTRACT

A multifunctional cleaning machine includes a housing, a water inlet pipe, and a nozzle. A cleaning chamber is defined by a side wall of the housing. The water inlet pipe is connected to the housing. The water inlet pipe has a first water inlet and a first water outlet. The first water inlet is located on the upper side of the housing. The first water outlet is located on the lower side of the housing. The first water outlet is located in the cleaning chamber, and the first water inlet is used for connecting to a high pressure water source. The nozzle is located in the cleaning chamber and includes a connector and a water spray rod. A first water jet is provided at one side of the water spray rod, and a second water jet is provided on the other side of the water spray rod.

20 Claims, 8 Drawing Sheets

(56) References Cited

U.S. PATENT DOCUMENTS

| | | | | | |
|---|---|---|---|---|---|
| 4,377,018 | A | * | 3/1983 | Cain | A47L 11/30 15/345 |
| 4,443,271 | A | * | 4/1984 | Goerss | B08B 3/02 134/34 |
| 5,209,245 | A | * | 5/1993 | Chapman | B08B 9/023 134/122 R |
| 5,312,044 | A | * | 5/1994 | Eaton | A47L 11/4088 239/289 |
| D375,591 | S | * | 11/1996 | Fryoux | D32/15 |
| 5,711,051 | A | * | 1/1998 | Roden | A47L 11/30 15/385 |
| 5,826,298 | A | * | 10/1998 | Rohrbacher | E01H 1/103 15/340.1 |
| 6,216,312 | B1 | * | 4/2001 | Rowan | A47L 11/30 15/385 |
| 6,378,163 | B1 | * | 4/2002 | Moll | E01H 1/103 15/387 |
| 10,264,939 | B2 | * | 4/2019 | Studebaker | A47L 11/305 |
| 2006/0037635 | A1 | | 2/2006 | Rhodes | |
| 2007/0277562 | A1 | | 12/2007 | Uhlin | |
| 2011/0036380 | A1 | | 2/2011 | Joost et al. | |
| 2012/0151708 | A1 | * | 6/2012 | Carter | A47L 11/4088 15/345 |
| 2013/0118529 | A1 | * | 5/2013 | Gromes, Sr. | A47L 11/282 134/21 |

* cited by examiner

MULTIFUNCTIONAL CLEANING MACHINE

CROSS-REFERENCE TO RELATED APPLICATIONS

The application claims priority of Chinese patent application CN2023212728122, filed on May 24, 2023, which is incorporated herein by reference in its entireties.

TECHNICAL FIELD

The present disclosure relates to the technical field of cleaning machines, in particular to a multifunctional cleaning machine.

BACKGROUND

Cleaning machine is mostly used for floor cleaning of hotels, parks and squares, factory workshops and other places, suitable for dirt cleaning such as surface oil for tile floor, stone floor, epoxy floor, emery floor, terrazzo floor, plastic floor, vitrified bricks, PVC floor and other hard floor, and more time-saving, energy-saving, money-saving, efficient, and better in cleaning effect in comparison with manual cleaning. However, the existing cleaning machine on the market is single in function and can only clean floor, so the usage scenario is single. Moreover, sewage generated after cleaning the floor will remain on the floor, which leads to poor cleaning effect and slippery floor, increasing the safety risks. As a result, the users' requirements in more scenarios cannot be meet. Therefore, there is an urgent need to provide a multifunctional cleaning machine in markets to meet the users' requirements in more scenarios.

SUMMARY

The present disclosure provides a multifunctional cleaning machine including: a housing having a cleaning chamber, the cleaning chamber being defined by the side wall of the housing; a water inlet pipe connected to the housing, the water inlet pipe having a first water inlet and a first water outlet, the first water inlet being located on an upper side of the housing, the first water outlet being located on a lower side of the housing, the first water outlet being located in the cleaning chamber, and the first water inlet being used for connecting to a high pressure water source; a nozzle located in the cleaning chamber, the nozzle including a connector and a water spray rod, one end of the connector being rotatably connected to the first water outlet, and the other end of the connector being connected to the water spray rod; a first water jet being provided at one side of the water spray rod, and a second water jet being provided on the other side of the water spray rod; the first water inlet, the first water outlet, the first water jet, and the second water jet are communicated with each other; and a water drainage pipe connected to the housing, the water drainage pipe having a second water inlet and a second water outlet, the second water inlet being located on the lower side of the housing, the second water inlet being located in the cleaning chamber, and the second water outlet being located on the upper side of the housing.

As the improvement of the present disclosure, further including a connecting pipe, the connecting pipe including a third water inlet and a third water outlet, the water inlet pipe being also provided with a fourth water outlet, the water drainage pipe being also provided with a fourth water inlet; and the third water inlet being communicated with the fourth water outlet, and the third water outlet being communicated with the fourth water inlet, so that the high pressure water source is able to pass through the water inlet pipe, the connecting pipe, and the water drainage pipe in sequence, and eject sewage in the water drainage pipe through the second water outlet.

As the improvement of the present disclosure, when the high pressure water source passes through the first water inlet, the first water outlet, the first water jet, and the second water jet in sequence and is ejected through the first water jet and the second water jet, the water spray rod rotates to enable the high pressure water source ejected from the first water jet and the second water jet to form a rotational flow in the cleaning chamber for spray washing the floor; and after the rotational flow spray washes the floor, the rotational flow in the cleaning chamber passes through the second water inlet and the second water outlet in sequence together with the sewage, and is discharged from the second water outlet.

As the improvement of the present disclosure, the water drainage pipe includes a water inlet part and a water outlet part, the water inlet part is located in the cleaning chamber, the water outlet part is located on the upper side of the housing, the water inlet part and the water outlet part are communicated with each other, the second water inlet is provided at the water inlet part, and the second water outlet is provided at the water outlet part.

As the improvement of the present disclosure, the water inlet part is a ring-shaped water inlet part, the number of the second water inlets is at least two, and the at least two second water inlets are evenly provided around the water inlet part the circumferentially.

As the improvement of the present disclosure, a fixing bracket is provided on the inner side wall of the housing, and the fixing bracket fixes the water inlet part into the cleaning chamber.

As the improvement of the present disclosure, a surface of the fixing bracket is sleeved with a flexible protective sleeve.

As the improvement of the present disclosure, the fixing bracket is a barb-shaped fixing bracket.

As the improvement of the present disclosure, a splash shield is provided on the lower side of the housing.

As the improvement of the present disclosure, further including a wheel assembly, and a connecting assembly, the wheel assembly being connected to the housing through the connecting assembly.

The present disclosure provides a multifunctional cleaning machine including: a housing including a cleaning chamber; a water inlet pipe connected to the housing, the water inlet pipe including a first water inlet and a first water outlet, the first water inlet being located on a first side of the housing, the first water outlet being located on a second side of the housing, the first water outlet being located in the cleaning chamber, and the first water inlet being configured for connecting to a high pressure water source; a nozzle located in the cleaning chamber, the nozzle including a connector and a water spray rod, one end of the connector being rotatably connected to the first water outlet, and the other end of the connector being connected to the water spray rod, a first water jet being provided at one side of the water spray rod, and a second water jet being provided on the other side of the water spray rod; the first water inlet, the first water outlet, the first water jet, and the second water jet being communicated with each other; and a water drainage pipe connected to the housing, the water drainage pipe including a second water inlet and a second water outlet, the second water inlet being located on the second side of the housing, the second water inlet being located in the cleaning chamber, and the second water outlet being located on the first side of the housing.

As the improvement of the present disclosure, further including a connecting pipe, the connecting pipe including a third water inlet and a third water outlet, the water inlet pipe being provided with a fourth water outlet, the water drainage pipe being provided with a fourth water inlet; and the third water inlet being communicated with the fourth water outlet, and the third water outlet being communicated with the fourth water inlet, so that the high pressure water source is able to pass through the water inlet pipe, the connecting pipe, and the water drainage pipe in sequence, and eject sewage in the water drainage pipe through the second water outlet.

As the improvement of the present disclosure, when the high pressure water source passes through the first water inlet, the first water outlet, the first water jet, and the second water jet in sequence and is ejected through the first water jet and the second water jet, the water spray rod rotates to enable the high pressure water source ejected from the first water jet and the second water jet to form a rotational flow in the cleaning chamber for spray washing the floor; and after the rotational flow spray washes the floor, the rotational flow in the cleaning chamber passes through the second water inlet and the second water outlet in sequence together with the sewage, and is discharged from the second water outlet.

As the improvement of the present disclosure, the water drainage pipe includes a water inlet part and a water outlet part, the water inlet part is located in the cleaning chamber, the water outlet part is located on the first side of the housing, the water inlet part and the water outlet part are communicated with each other, the second water inlet is provided at the water inlet part, and the second water outlet is provided at the water outlet part.

As the improvement of the present disclosure, the water inlet part is a ring-shaped water inlet part, the number of the second water inlets is at least two, and the at least two second water inlets are evenly provided around the water inlet part the circumferentially.

As the improvement of the present disclosure, a fixing bracket is provided on the inner side wall of the housing, and the fixing bracket fixes the water inlet part into the cleaning chamber.

As the improvement of the present disclosure, a surface of the fixing bracket is sleeved with a flexible protective sleeve.

As the improvement of the present disclosure, the fixing bracket is a barb-shaped fixing bracket.

As the improvement of the present disclosure, wherein a splash shield is provided on the lower side of the housing.

As the improvement of the present disclosure, further including a wheel assembly, and a connecting assembly, the wheel assembly (8) being connected to the housing through the connecting assembly.

BRIEF DESCRIPTION OF THE DRAWINGS

The present disclosure is further described below in detail in combination with the accompanying drawings and embodiments.

DETAILED DESCRIPTION OF THE EMBODIMENTS

Figure 1:
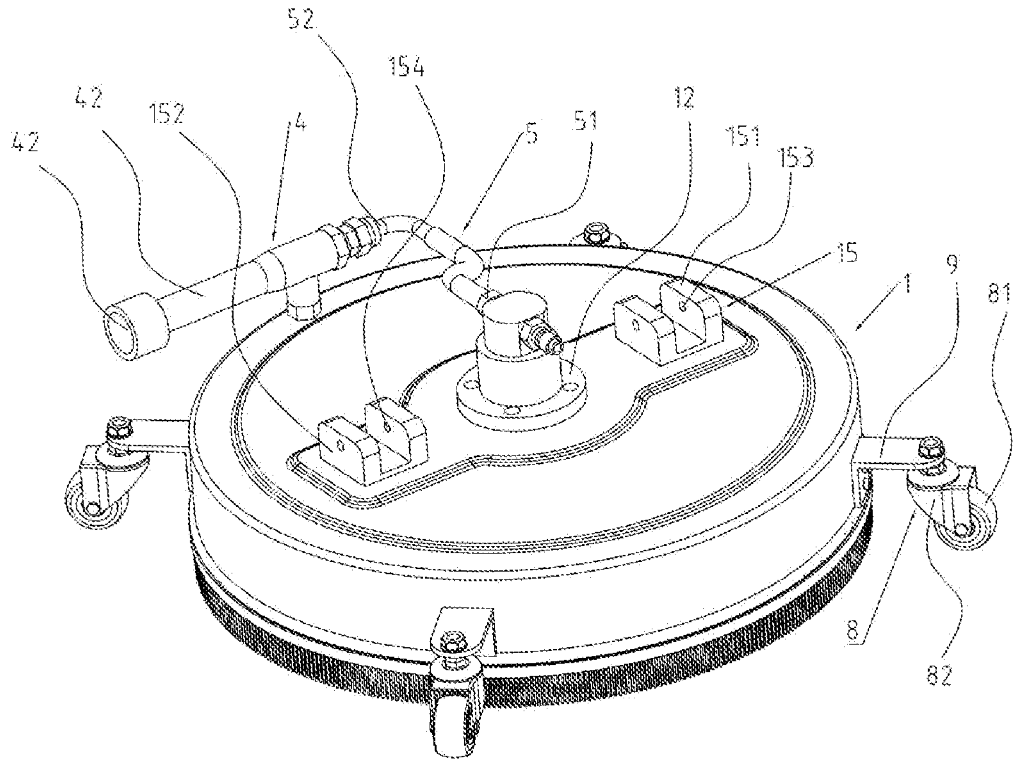
FIG. 1 is a schematic diagram of an overall structure of the present disclosure.
Figure 2:
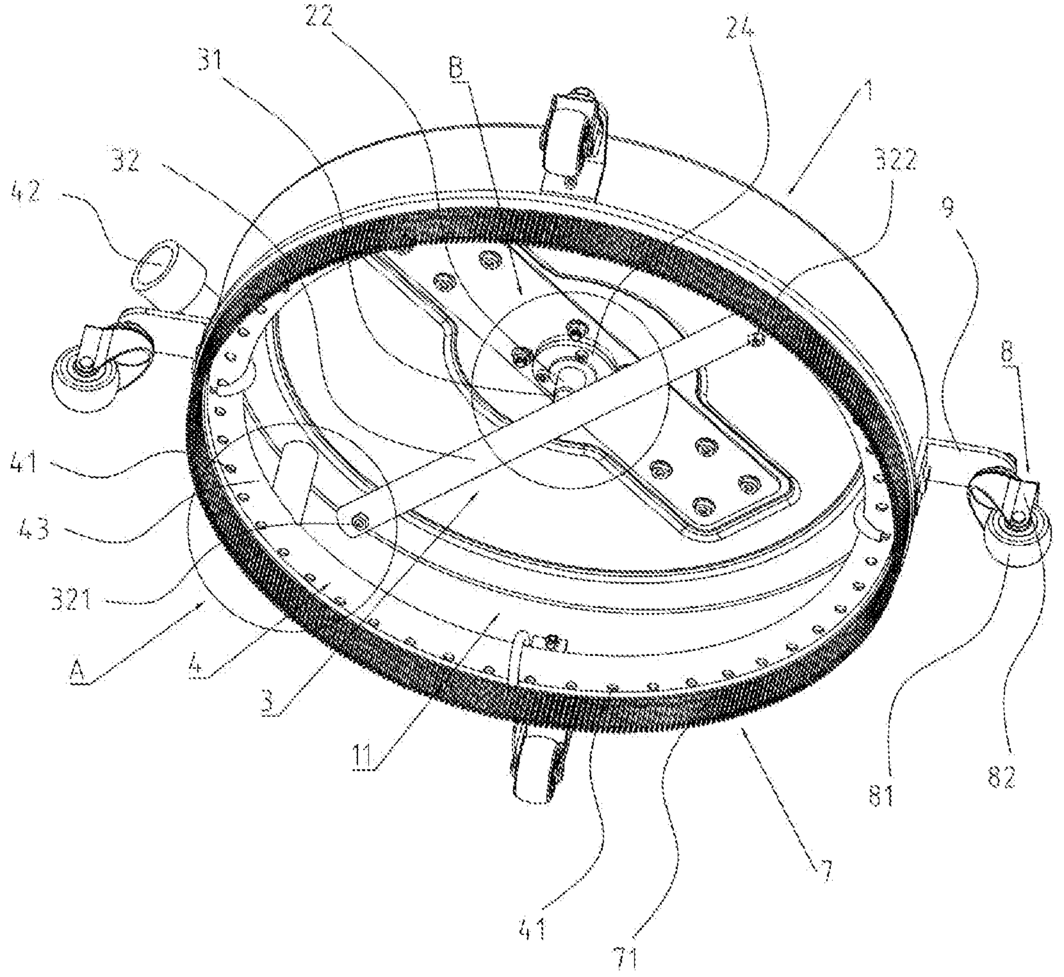
FIG. 2 is a schematic diagram of another overall structure of the present disclosure.
Figure 3:
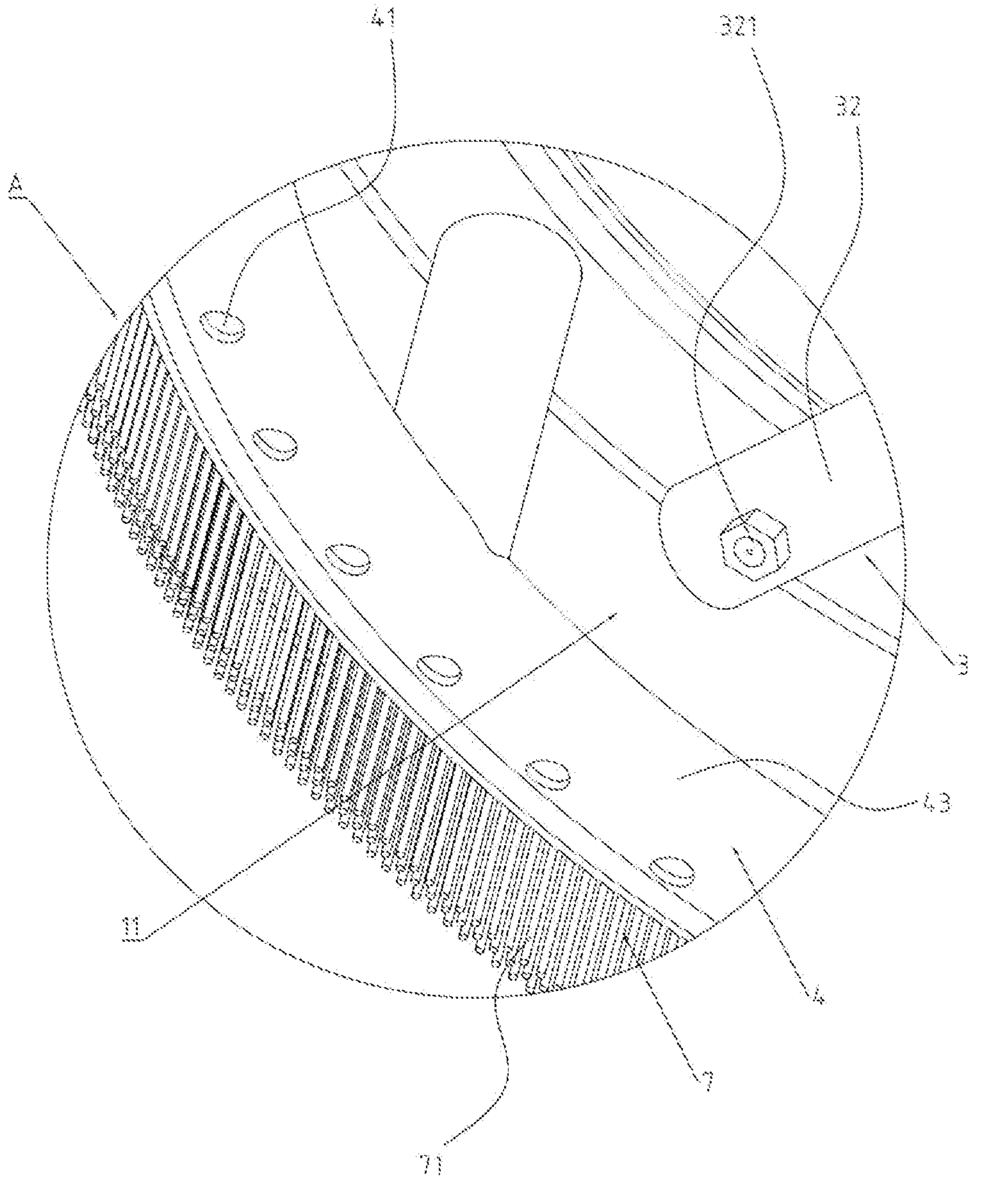
FIG. 3 is an enlarged view of part A in FIG. 2.
Figure 4:
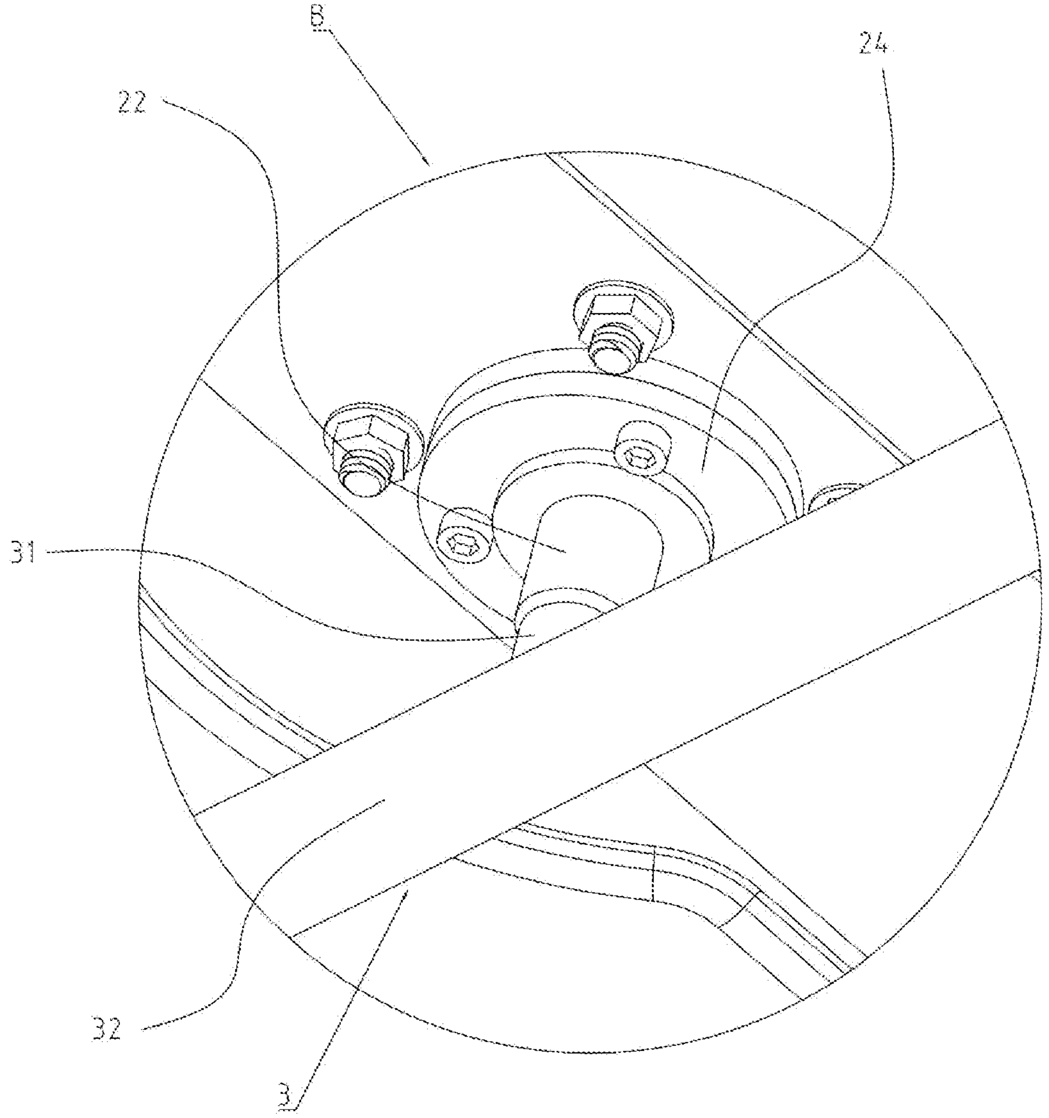
FIG. 4 is an enlarged view of part B in FIG. 2.
Figure 5:
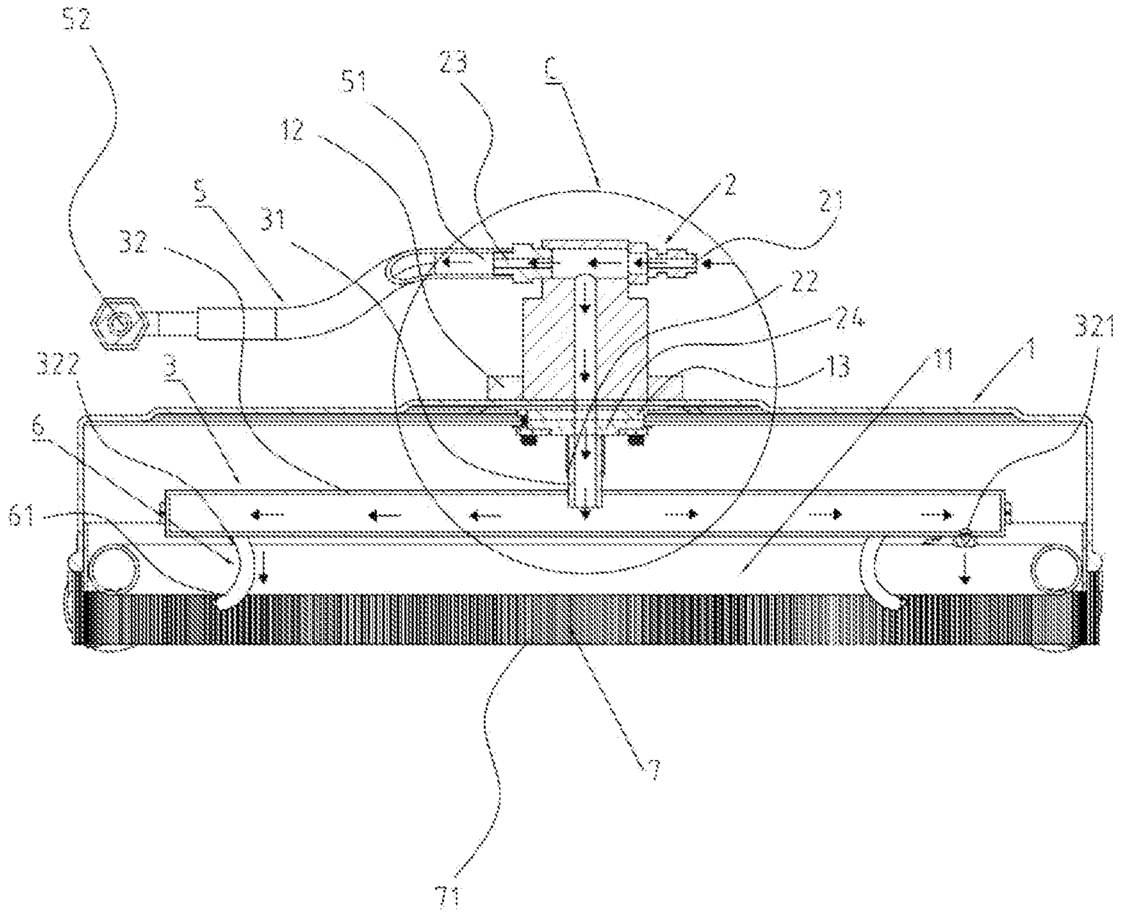
FIG. 5 is a cross-sectional view cut along a nozzle, a water inlet pipe, and a connecting pipe.
Figure 6:
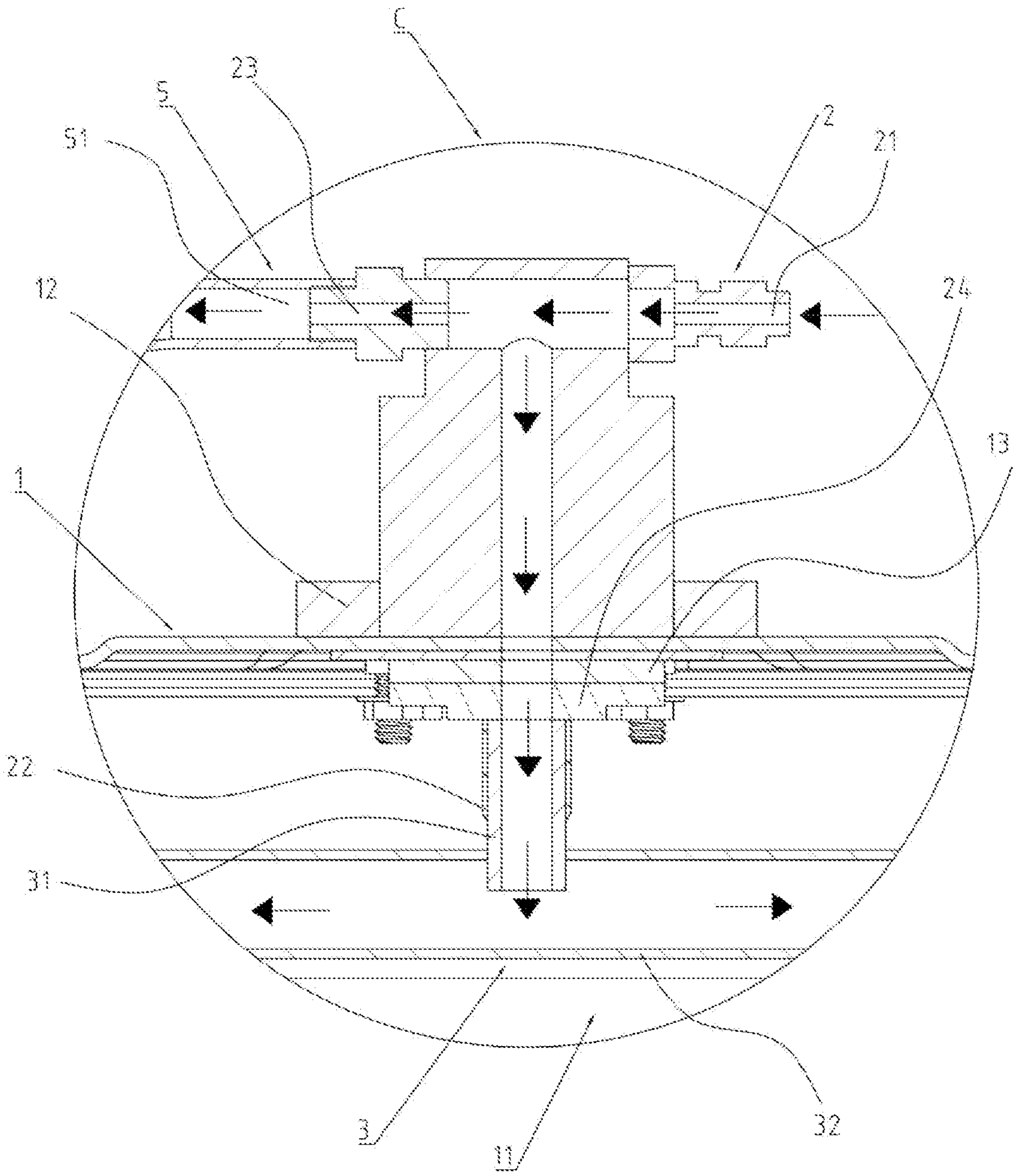
FIG. 6 is an enlarged view of part C in FIG. 5.
Figure 7:
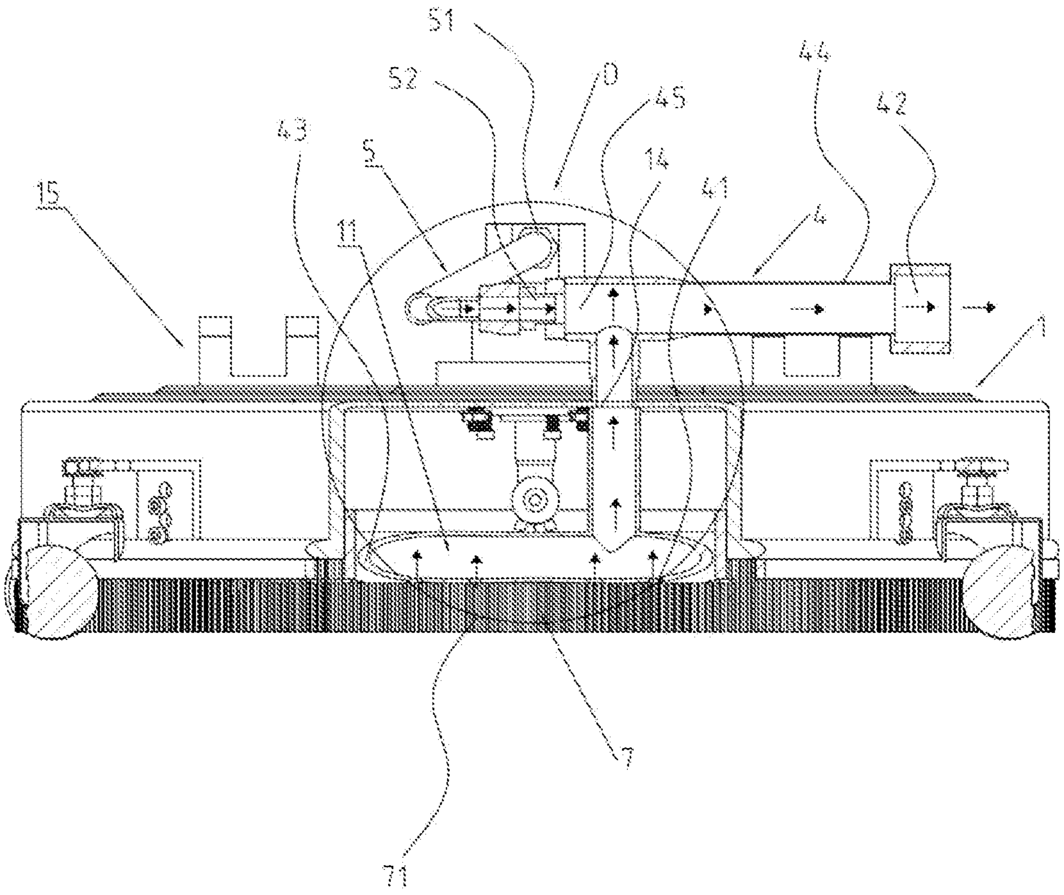
FIG. 7 is a cross-sectional view cut along a connecting pipe, a water inlet part of a water drainage pipe, and a water outlet part of the water drainage pipe.
Figure 8:
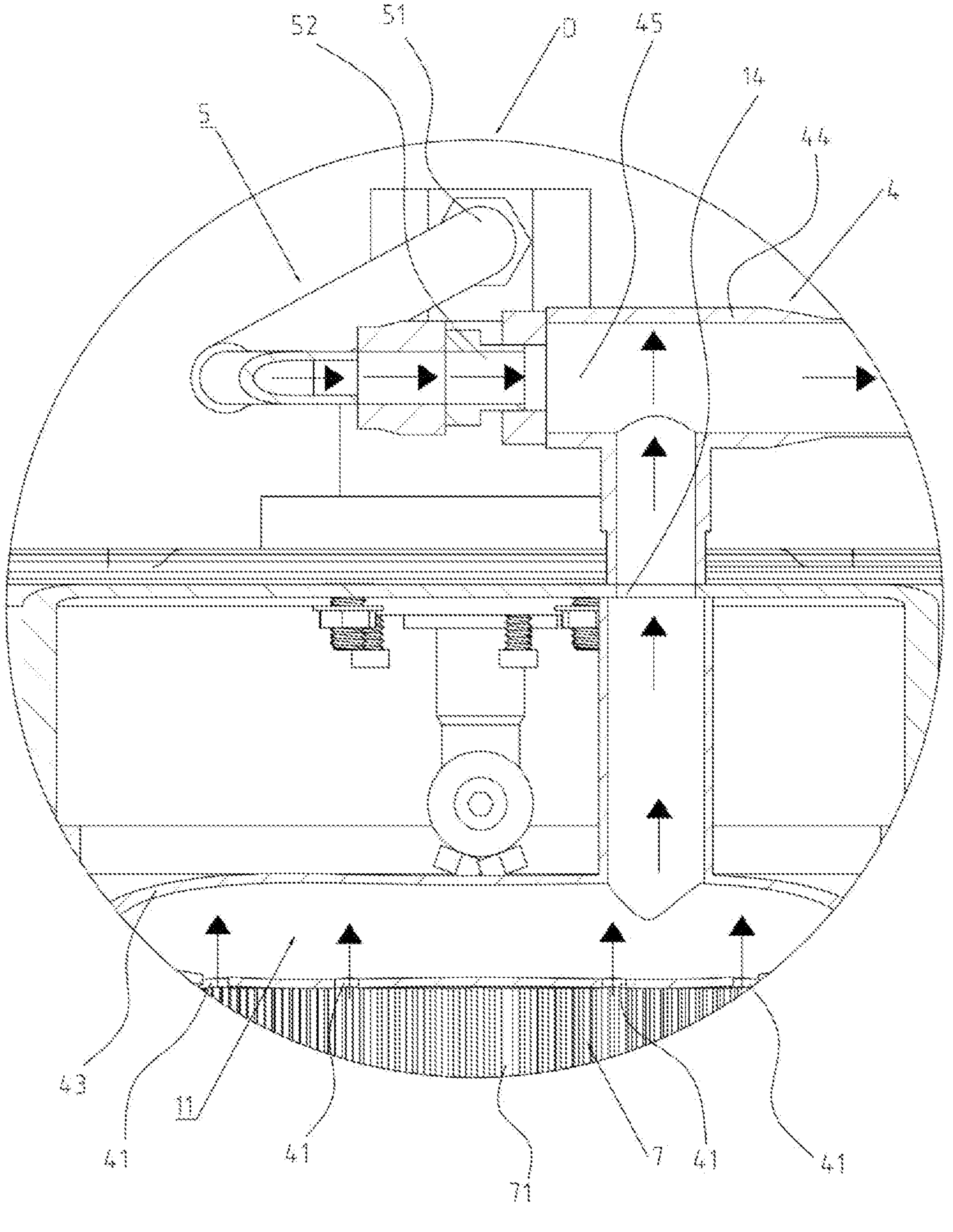
FIG. 8 is an enlarged view of part D in FIG. 7.

Referring to FIGS. 1 to 8, a multifunctional cleaning machine includes a housing 1, a water inlet pipe 2, a nozzle 3, and a water drainage pipe 4. The housing 1 has a cleaning chamber 11. The cleaning chamber 11 is defined by the side wall of the housing 1. The water inlet pipe 2 is connected to the housing 1. The water inlet pipe 2 has a first water inlet 21 and a first water outlet 22. The first water inlet 21 is located on an upper side of the housing 1. The first water outlet 22 is located on a lower side of the housing 1. The first water outlet 22 is located in the cleaning chamber. The first water inlet 21 is used for connecting to a high pressure water source. The nozzle 3 is located in the cleaning chamber 11. The nozzle 3 includes a connector 31 and a water spray rod 32. One end of the connector 31 is rotatably connected to the first water outlet 22. The other end of the connector 31 is connected to the water spray rod 32. A first water jet 321 is provided at one side of the water spray rod 32. A second water jet 322 is provided on the other side of the water spray rod 32. The first water inlet 21, the first water outlet 22, the first water jet 321, and the second water jet 322 are communicated with each other. The water drainage pipe 4 is connected to housing 1. The water drainage pipe 4 has a second water inlet 41 and a second water outlet 42. The second water inlet 41 is located on the lower side of the housing 1. The second water inlet 41 is located in the cleaning chamber 11. The second water outlet 42 is located on the upper side of the housing 1.

With the above structure, the high pressure water source can pass through the first water inlet 21, the first water outlet 22, the first water jet 321, and the second water jet 322 in sequence and is ejected through the first water jet 321 and the second water jet 322. The reaction force generated by the high pressure water source when ejected from the first water jet and the second water can drive the rotation of the water spray rod to enable the high pressure water source ejected from the first water jet 321 and the second water jet 322 to form a rotational flow in the cleaning chamber 11 for spray washing the floor. After the rotational flow spray washes the floor, the rotational flow in the cleaning chamber 11 passes through the second water inlet 41 and the second water outlet 42 in sequence together with the sewage, and the sewage is discharged from the second water outlet 42, such that the multifunctional cleaning machine can spray wash the floor while sucking the sewage generated by spray washing the floor and discharging through the second water outlet to a sewage bucket or outside.

In this embodiment, the multifunctional cleaning machine further includes a connecting pipe 5. The connecting pipe 5 includes a third water inlet 51 and a third water outlet 52. The water inlet pipe 2 is also provided with a fourth water outlet 23. The water drainage pipe 4 is also provided with a fourth water inlet 45. The third water inlet 51 is communicated with the fourth water outlet 23, and the third water outlet 52 is communicated with the fourth water inlet 45, so that the high pressure water source can pass through the water inlet pipe 2, the connecting pipe 5, and the water drainage pipe 4 in sequence, and the sewage in the water drainage pipe 4 is ejected through the second water outlet 42. When the high pressure water source passes through the first water inlet 21, the first water outlet 22, the first water jet 321, and the second water jet 322 in sequence and is ejected through the first water jet 321 and the second water jet 322, the water spray rod rotates to enable the high pressure water source ejected from the first water jet 321 and the second water jet 322 to form a rotational flow in the cleaning chamber 11 for spray washing the floor. After the rotational flow spray washes the floor, the rotational flow in the cleaning chamber 11 passes through the second water inlet 41 and the second water outlet 42 in sequence together with the sewage, and is discharged from the second water outlet 42. With the above structure, when the rotational flow spray washes the floor, the rotational flow in the cleaning chamber 11 passes through the second water inlet 41 and enters the water drainage pipe together with the sewage, on the one hand, the rotational flow can enter the water drainage pipe together with the sewage to discharge through the second water outlet, on the other hand, the high pressure water source can pass through the first water inlet, the fourth water outlet, the third water inlet, the fourth water outlet, the fourth water inlet, and the second water outlet in sequence, such that the high pressure water source can pass through the water inlet pipe 2, the connecting pipe 5, and the water drainage pipe 4 in sequence, and the sewage in the water drainage pipe 4 is discharged through the second water outlet 42 to the sewage bucket or outside.

In this embodiment, the water drainage pipe 4 includes a water inlet part 43 and a water outlet part 44. The water inlet part 43 is located in the cleaning chamber 11. The water outlet part 44 is located on the upper side of the housing 1. The water inlet part 43 and the water outlet part 44 are communicated with each other. The second water inlet 41 is provided at the water inlet part 43. The second water outlet 42 is provided at the water outlet part 44. The water inlet part 44 is a ring-shaped water inlet part 44. The number of the second water inlets 41 is at least 2. The at least 2 second water inlets 41 are evenly provided around the water inlet part 44 circumferentially. Specifically, a fixing bracket 6 is provided on the inner side wall of the housing 1. The fixing bracket 6 fixes the water inlet part 44 into the cleaning chamber 11. Further, a surface of the fixing bracket 6 is sleeved with a flexible protective sleeve 61. Still further, the fixing bracket 6 is a barb-shaped fixing bracket. Still further, the number of the fixing brackets 6 is at least 2. The at least 2 fixing brackets 6 are evenly provided around the ring-shaped water inlet part 43 circumferentially. With the above structure, the installation of the water drainage pipe is effectively achieved, and the ring-shaped water inlet part can be provided around the entire cleaning chamber. When the rotational flow spray washes the floor, it is convenient for the rotational flow in the cleaning chamber 11 to enter the second water inlet together with the sewage to discharge by the second water outlet 42. Moreover, the barb-shaped fixing bracket can install the water inlet part into the cleaning chamber tightly, to prevent the position of the water inlet part from deviating. Further, because the surface of the fixing bracket is sleeved with the flexible protective sleeve, it can not only protect the water inlet part effectively, but also prevent the water inlet part from making direct contact with the fixing bracket to generate noise when working.

In this embodiment, a splash shield 7 is provided on the lower side of the housing 1. The splash shield 7 is formed by stacking a number of flexible screw rods 71. With the above structure, on the one hand, when the high pressure water source passes through the first water inlet 21, the first water outlet 22, the first water jet 321, and the second water jet 322 in sequence and is ejected through the first water jet 321 and the second water jet 322, the reaction force generated by the high pressure water source when ejected from the first water jet and the second water can drive the rotation of the water spray rod to enable the high pressure water source ejected from the first water jet 321 and the second water jet 322 to form a rotational flow in the cleaning chamber 11 for spray washing the floor, the splash shield can block the rotational flow in the cleaning chamber to prevent the rotational flow from splashing to a user. On the other hand, after the rotational flow spray washes the floor, the splash shield can block the sewage into the cleaning chamber, such that the rotational flow in the cleaning chamber 11 passes through the second water inlet 41 and the second water outlet 42 in sequence together with the sewage, and the sewage is discharged from the second water outlet 42, such that the multifunctional cleaning machine can spray wash the floor while sucking the sewage generated by spray washing the floor and discharging through the second water outlet to a sewage bucket or outside.

In this embodiment, the multifunctional cleaning machine further includes a wheel assembly 8, and a connecting assembly 9. The wheel assembly 8 is connected to the housing 1 through the connecting assembly 9. The wheel assembly 8 includes a wheel 81 and a wheel bracket 82. The wheel 81 is connected to the wheel bracket 82. The wheel bracket 82 is rotatably connected to the connecting assembly 9 by a spindle 83. The number of the wheel assemblies is 4. The wheel assemblies 4 are evenly provided around the side wall of the housing circumferentially. With the above structure, since the wheel bracket 82 is rotatably connected to the connecting assembly 9 by a spindle 83, it is easy to steer the wheel connected to the wheel bracket. Therefore, the user can push the multifunctional cleaning machine to clean the floor.

In this embodiment, the water outlet part 44 is detachably connected to the water inlet part 43. With the above structure, the structure is simple, the connection is stable, and it is easy for the user to install the water drainage pipe.

In this embodiment, the nozzle 3 is T-shaped to form the connector 31 on the upper side and the water spray rod 32 on the lower side. With the above structure, the connector is rotatably connected to the first water outlet, such that the water spray rod connected to the connector can rotate with the connector along the axis of the connector.

In this embodiment, the water inlet pipe 2 is provided with a first connecting plate 24, the housing 1 is provided with a second connecting plate 12, and the first connecting plate 24 is detachably connected to the second connecting plate 12, such that the water inlet pipe 2 is connected to the housing 1. The housing 1 has a first installation port 13. When the water inlet pipe 2 penetrates into the cleaning chamber 11 via the first installation port 13 from the upper side of the housing, the first connecting plate 24 is detachably connected to the second connecting plate 12. Specifically, the first connecting plate and the second connecting plate are detachably connected to each other by screws. With the above structure, the structure is simple, the connection is stable, and the installation of the water inlet pipe is effectively realized.

In this embodiment, the housing 1 also has a second installation port 14. The water outlet part of the water drainage pipe 4 penetrates into the cleaning chamber 11 via the second installation port 14 from the upper side of the housing 1 and is connected to the water outlet part. With the above structure, the structure is simple, the connection is stable, and the installation of the water drainage pipe is effectively realized.

In this embodiment, the upper side of the housing 1 is also provided with a connecting member 15. The connecting member 15 is used for installation of a handle. The connecting member 15 includes a first connecting block 151 and a second connecting block 152. The first connecting block 151 is provided with a third installation port 153. The second connecting block 152 is provided with a fourth installation port 154. The third installation port 153 and the fourth installation port 154 are used for installation of the handle. The handle may be a U-shaped handle. With the above structure, one side of the U-shaped handle can be rotatably connected to the third installation port of the first connecting block through a spindle, and the other side of the U-shaped handle can be connected to the fourth installation port of the second connecting block through a spindle to install the handle onto the multifunctional cleaning machine. Therefore, the user can push the multifunctional cleaning machine by the handle to clean the floor.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A multifunctional cleaning machine, comprising:

a housing (1), having a cleaning chamber (11), the cleaning chamber (11) being defined by a side wall of the housing (1);

a water inlet pipe (2), being connected to the housing (1), the water inlet pipe (2) having a first water inlet (21) and a first water outlet (22), the first water inlet (21) being located on an upper side of the housing (1), the first water outlet (22) being located on a lower side of the housing (1), the first water outlet (22) being located in the cleaning chamber (11), and the first water inlet (21) being used for connecting to a pressure water source;

a nozzle (3), being located in the cleaning chamber (11), the nozzle (3) comprising a connector (31) and a water spray rod (32), one end of the connector (31) being rotatably connected to the first water outlet (22), and the other end of the connector (31) being connected to the water spray rod (32); a first water jet (321) being provided at one side of the water spray rod (32), and a second water jet (322) being provided on the other side of the water spray rod (32); the first water inlet (21), the first water outlet (22), the first water jet (321), and the second water jet (322) being communicated with each other; and a water drainage pipe (4), being connected to the housing (1), the water drainage pipe (4) having a second water inlet (41) and a second water outlet (42), the second water inlet (41) being located on the lower side of the housing (1), the second water inlet (41) being located in the cleaning chamber (11), and the second water outlet (42) being located on the upper side of the housing (1).

2. The multifunctional cleaning machine according to claim 1, further comprising a connecting pipe (5), the connecting pipe (5) comprising a third water inlet (51) and a third water outlet (52), the water inlet pipe (2) being provided with a fourth water outlet (23), the water drainage pipe (4) being provided with a fourth water inlet (45); and the third water inlet (51) being communicated with the fourth water outlet (23), and the third water outlet (52) being communicated with the fourth water inlet (45), so that the pressure water source is able to pass through the water inlet pipe (2), the connecting pipe (5), and the water drainage pipe (4) in sequence, and eject sewage in the water drainage pipe (4) through the second water outlet (42).

3. The multifunctional cleaning machine according to claim 2, wherein when the pressure water source passes through the first water inlet (21), the first water outlet (22), the first water jet (321), and the second water jet (322) in sequence and is ejected through the first water jet (321) and the second water jet (322), the water spray rod rotates to enable the pressure water source ejected from the first water jet (321) and the second water jet (322) to form a rotational flow in the cleaning chamber (11) for spray washing the floor; and after the rotational flow spray washes the floor, the rotational flow in the cleaning chamber (11) passes through the second water inlet (41) and the second water outlet (42) in sequence together with the sewage, and is discharged from the second water outlet (42).

4. The multifunctional cleaning machine according to claim 1, wherein the water drainage pipe (4) comprises a water inlet part (43) and a water outlet part (44), the water inlet part (43) is located in the cleaning chamber (11), the water outlet part (44) is located on the upper side of the housing (1), the water inlet part (43) and the water outlet part (44) are communicated with each other, the second water inlet (41) is provided at the water inlet part (43), and the second water outlet (42) is provided at the water outlet part (44).

5. The multifunctional cleaning machine according to claim 4, wherein the water inlet part (44) is a ring-shaped water inlet part (44), the number of the second water inlets (41) is at least two, and the at least two second water inlets (41) are evenly provided around the water inlet part (44) circumferentially.

6. The multifunctional cleaning machine according to claim 4, wherein a fixing bracket (6) is provided on the inner side wall of the housing (1), and the fixing bracket (6) fixes the water inlet part (44) into the cleaning chamber (11).

7. The multifunctional cleaning machine according to claim 6, wherein a surface of the fixing bracket (6) is sleeved with a flexible protective sleeve (61).

8. The multifunctional cleaning machine according to claim 6, wherein the fixing bracket (6) is a barb-shaped fixing bracket.

9. The multifunctional cleaning machine according to claim 1, wherein a splash shield (7) is provided on the lower side of the housing (1).

10. The multifunctional cleaning machine according to claim 1, further comprising a wheel assembly (8), and a connecting assembly (9), the wheel assembly (8) being connected to the housing (1) through the connecting assembly (9).

11. A multifunctional cleaning machine, comprising:

a housing (1) comprising a cleaning chamber (11);

a water inlet pipe (2) connected to the housing (1), the water inlet pipe (2) comprising a first water inlet (21) and a first water outlet (22), the first water inlet (21) being located on a first side of the housing (1), the first water outlet (22) being located on a second side of the housing (1), the first water outlet (22) being located in the cleaning chamber (11), and the first water inlet (21) being configured for connecting to a pressure water source;

a nozzle (3) located in the cleaning chamber (11), the nozzle (3) comprising a connector (31) and a water spray rod (32), one end of the connector (31) being rotatably connected to the first water outlet (22), and the other end of the connector (31) being connected to the water spray rod (32), a first water jet (321) being provided at one side of the water spray rod (32), and a second water jet (322) being provided on the other side of the water spray rod (32); the first water inlet (21), the first water outlet (22), the first water jet (321), and the second water jet (322) being communicated with each other; and a water drainage pipe (4) connected to the housing (1), the water drainage pipe (4) comprising a second water inlet (41) and a second water outlet (42), the second water inlet (41) being located on the second side of the housing (1), the second water inlet (41) being located in the cleaning chamber (11), and the second water outlet (42) being located on the first side of the housing (1).

12. The multifunctional cleaning machine according to claim 11, further comprising a connecting pipe (5), the connecting pipe (5) comprising a third water inlet (51) and a third water outlet (52), the water inlet pipe (2) being provided with a fourth water outlet (23), the water drainage pipe (4) being provided with a fourth water inlet (45); and the third water inlet (51) being communicated with the fourth water outlet (23), and the third water outlet (52) being communicated with the fourth water inlet (45), so that the pressure water source is able to pass through the water inlet pipe (2), the connecting pipe (5), and the water drainage pipe (4) in sequence, and eject sewage in the water drainage pipe (4) through the second water outlet (42).

13. The multifunctional cleaning machine according to claim 12, wherein when the pressure water source passes through the first water inlet (21), the first water outlet (22), the first water jet (321), and the second water jet (322) in sequence and is ejected through the first water jet (321) and the second water jet (322), the water spray rod rotates to enable the pressure water source ejected from the first water jet (321) and the second water jet (322) to form a rotational flow in the cleaning chamber (11) for spray washing the floor; and after the rotational flow spray washes the floor, the rotational flow in the cleaning chamber (11) passes through the second water inlet (41) and the second water outlet (42) in sequence together with the sewage, and is discharged from the second water outlet (42).

14. The multifunctional cleaning machine according to claim 11, wherein the water drainage pipe (4) comprises a water inlet part (43) and a water outlet part (44), the water inlet part (43) is located in the cleaning chamber (11), the water outlet part (44) is located on the first side of the housing (1), the water inlet part (43) and the water outlet part (44) are communicated with each other, the second water inlet (41) is provided at the water inlet part (43), and the second water outlet (42) is provided at the water outlet part (44).

15. The multifunctional cleaning machine according to claim 14, wherein the water inlet part (44) is a ring-shaped water inlet part (44), the number of the second water inlets (41) is at least two, and the at least two second water inlets (41) are evenly provided around the water inlet part (44) circumferentially.

16. The multifunctional cleaning machine according to claim 14, wherein a fixing bracket (6) is provided on the inner side wall of the housing (1), and the fixing bracket (6) fixes the water inlet part (44) into the cleaning chamber (11).

17. The multifunctional cleaning machine according to claim 16, wherein a surface of the fixing bracket (6) is sleeved with a flexible protective sleeve (61).

18. The multifunctional cleaning machine according to claim 16, wherein the fixing bracket (6) is a barb-shaped fixing bracket.

19. The multifunctional cleaning machine according to claim 11, wherein a splash shield (7) is provided on the lower side of the housing (1).

20. The multifunctional cleaning machine according to claim 11, further comprising a wheel assembly (8), and a connecting assembly (9), the wheel assembly (8) being connected to the housing (1) through the connecting assembly (9).

* * * * *